US012804630B2

(12) United States Patent
Tsuchiya

(10) Patent No.: US 12,804,630 B2
(45) Date of Patent: Nov. 17, 2026

(54) COMMUNICATION DEVICE, CONTROL METHOD, AND COMPUTER-READABLE STORAGE MEDIUM

(71) Applicant: CANON KABUSHIKI KAISHA, Tokyo (JP)

(72) Inventor: Keigo Tsuchiya, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 18/926,043

(22) Filed: Oct. 24, 2024

(65) Prior Publication Data

US 2025/0056515 A1 Feb. 13, 2025

Related U.S. Application Data

(63) Continuation of application No. PCT/JP2023/014593, filed on Apr. 10, 2023.

(30) Foreign Application Priority Data

Apr. 26, 2022 (JP) ................................ 2022-072777

(51) Int. Cl.
*H04W 72/0453* (2023.01)
*H04L 27/26* (2006.01)
*H04W 84/12* (2009.01)

(52) U.S. Cl.
CPC ............................... *H04W 72/0453* (2013.01)

(58) Field of Classification Search
CPC .... H04W 72/0453; H04W 84/12; H04L 27/26
USPC ..... 455/456.1, 70, 522, 410, 436, 43, 414.4, 455/507, 458, 422.1
See application file for complete search history.

(56) References Cited

U.S. PATENT DOCUMENTS

| | | | | |
|---|---|---|---|---|
| 2020/0081665 | A1 | 3/2020 | Moriya | |
| 2021/0250775 | A1 * | 8/2021 | Hardin | H04W 16/14 |
| 2023/0070695 | A1 * | 3/2023 | Ansley | H04W 84/12 |

FOREIGN PATENT DOCUMENTS

| | | | |
|---|---|---|---|
| JP | 2012019487 | A | 1/2012 |
| JP | 2021103806 | A | 7/2021 |
| KR | 20220027838 | A | 3/2022 |
| WO | 2021002802 | A1 | 1/2021 |

OTHER PUBLICATIONS

FCC, R+O_FNPRM_promoting_unlicensed use of the 6GHz band_ ET Docket No. 18-295_Apr. 2, 2020, p. 1-125.
Gaurang Nail et al., Next Generation Wi-Fi and 5G NR-U in the 6 GHz Bands: Opportunities & Challenges, Jul. 30, 2020, p. 1-29.

* cited by examiner

*Primary Examiner* — Joseph Arevalo
(74) *Attorney, Agent, or Firm* — Canon U.S.A., Inc. IP Division

(57) ABSTRACT

A communication device, when operating in a state where it can obtain from an external device frequency information indicating a frequency available for use in wireless communication in the 6 GHz band, displays a setting screen including an option corresponding to the 6 GHz band as an available frequency band option for use when operating as a parent station.

19 Claims, 5 Drawing Sheets

COMMUNICATION DEVICE, CONTROL METHOD, AND COMPUTER-READABLE STORAGE MEDIUM

CROSS-REFERENCE TO RELATED APPLICATIONS

This application is a Continuation of International Patent Application No. PCT/JP2023/014593, filed Apr. 10, 2023, which claims the benefit of Japanese Patent Application No. 2022-072777, filed Apr. 26, 2022, both of which are hereby incorporated by reference herein in their entirety.

TECHNICAL FIELD

The present invention relates to a communication device.

BACKGROUND ART

Japanese Patent Laid-Open No. 2012-19487 discloses techniques for enabling an image forming device to simultaneously perform wireless communication in infrastructure mode and wireless communication in ad hoc mode.

CITATION LIST

Patent Literature

PTL 1 Japanese Patent Laid-Open No. 2012-19487

In recent years, wireless communication has been used in various cases, and it has been demanded to provide highly convenient wireless communication.

SUMMARY OF INVENTION

To solve the above problem, there is provided a communication device capable of performing first wireless communication via an external access point and second wireless communication without using an external access point, the communication device including at least one memory and at least one processor which function as: a display control unit configured to perform control to display, in a case where the communication device operates in a state in which the communication device is capable of obtaining frequency information indicating a frequency available for use in wireless communication in a 6 GHz band from an external device, a first setting screen including an option corresponding to the 6 GHz band as an available frequency band option for use when the communication device operates as a parent station in the second wireless communication, and, in a case where the communication device does not operate in a state in which the communication device is capable of obtaining the frequency information from the external device, to display a second setting screen where selecting the 6 GHz band as an available frequency band option for use when the communication device operates as a parent station in the second wireless communication is restricted; an identifying unit configured to identify a communication channel in the 6 GHz band based on the frequency information received from the external device in a case where an option corresponding to the 6 GHz band is selected on the first setting screen; and a wireless communication control unit configured to operate as a parent station in the second wireless communication using the identified channel, wherein a device operating as a parent station in the second wireless communication determines a communication channel to use in the second wireless communication.

Further features of the present invention will become apparent from the following description of exemplary embodiments with reference to the attached drawings.

Figure 2:
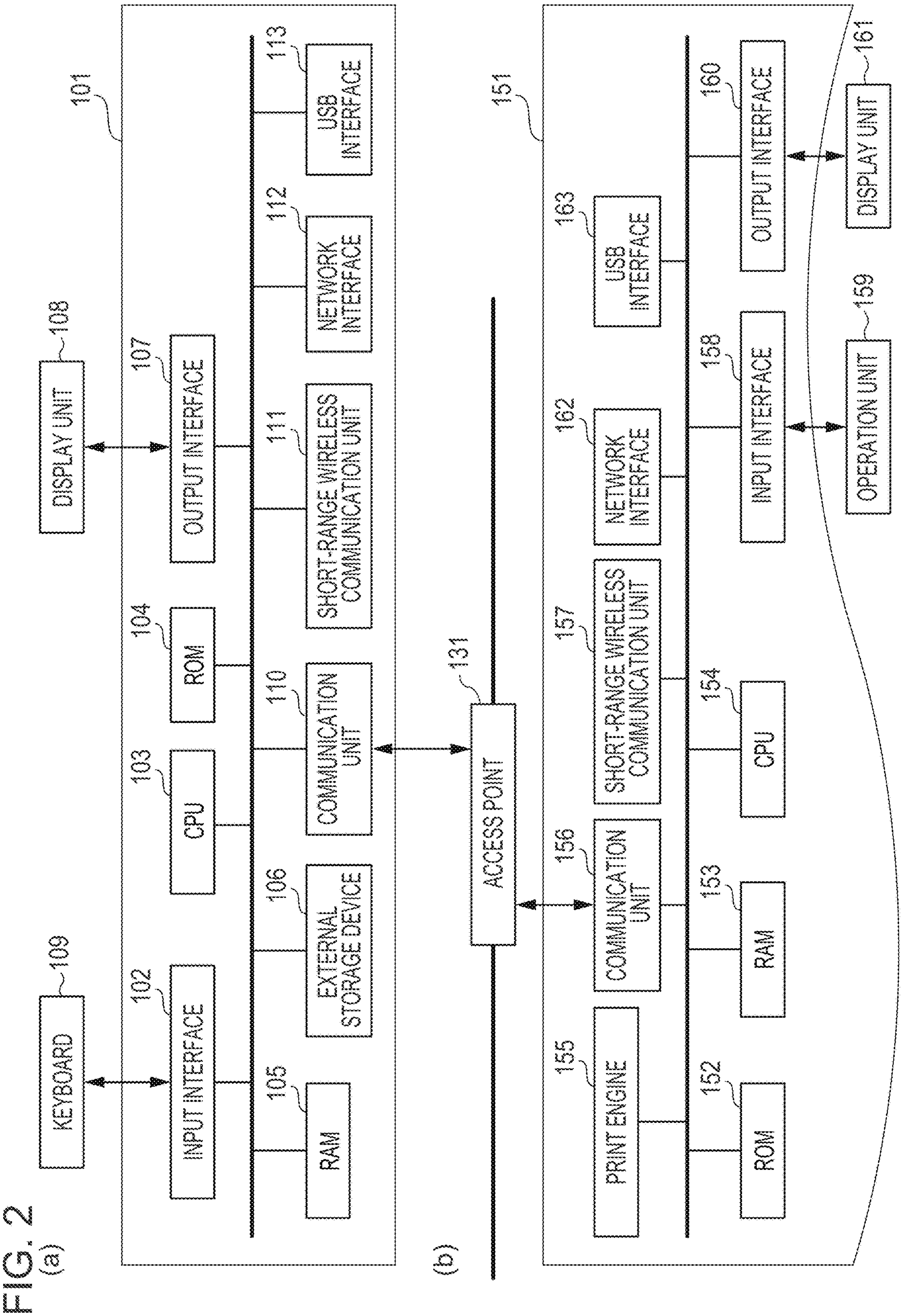

Part (a) of FIG. 2 is a diagram illustrating an example of a hardware configuration of a mobile terminal, and part (b) of FIG. 2 is a diagram illustrating an example of a hardware configuration of an image forming device.

Figure 3:
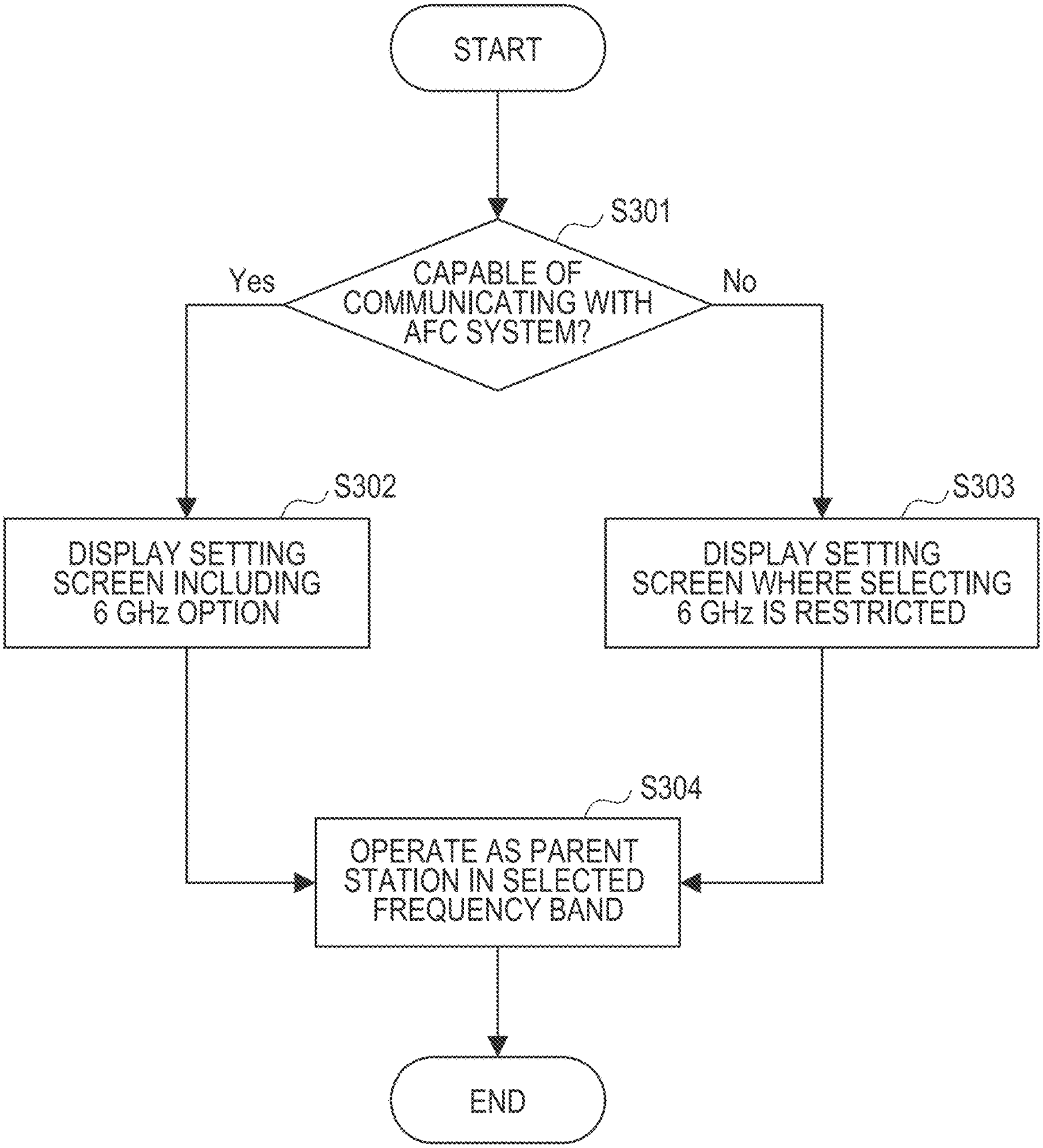

FIG. 3 is a diagram illustrating an example of a flowchart executed by a communication device.

Figure 4A:
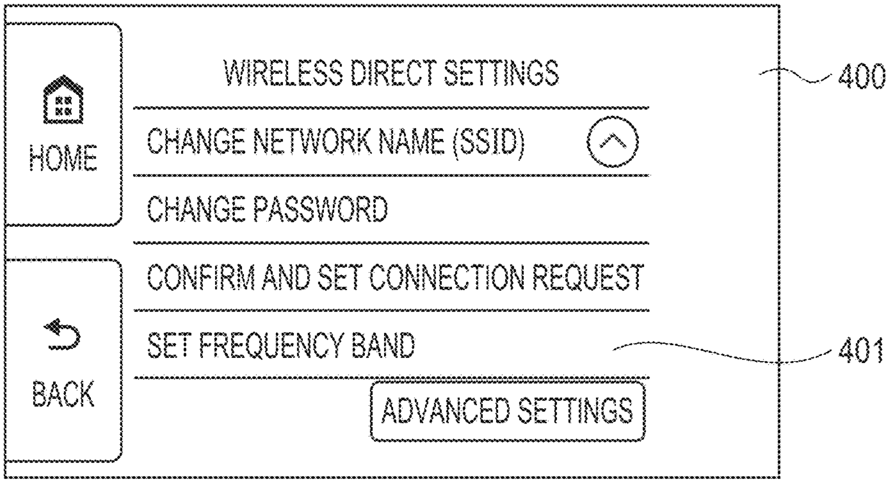

FIG. 4A is a diagram illustrating an example of a screen displayed on the communication device.

Figure 4B:
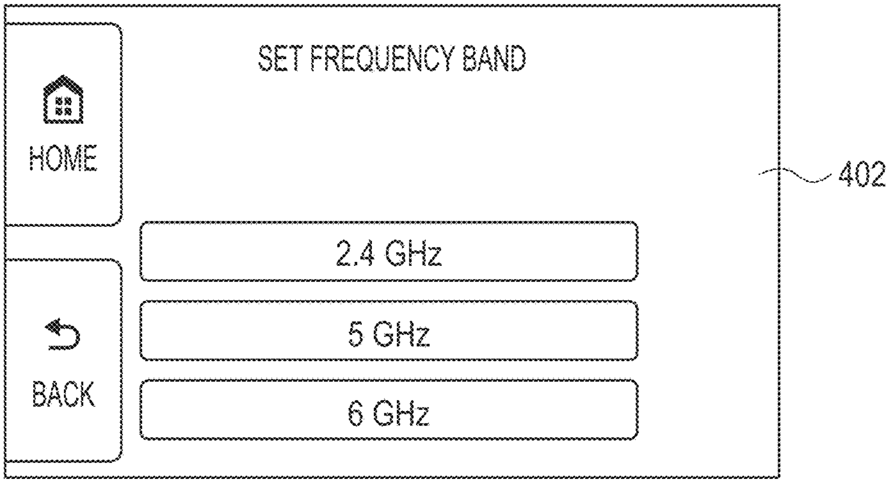

FIG. 4B is a diagram illustrating an example of a screen displayed on the communication device.

Figure 4C:
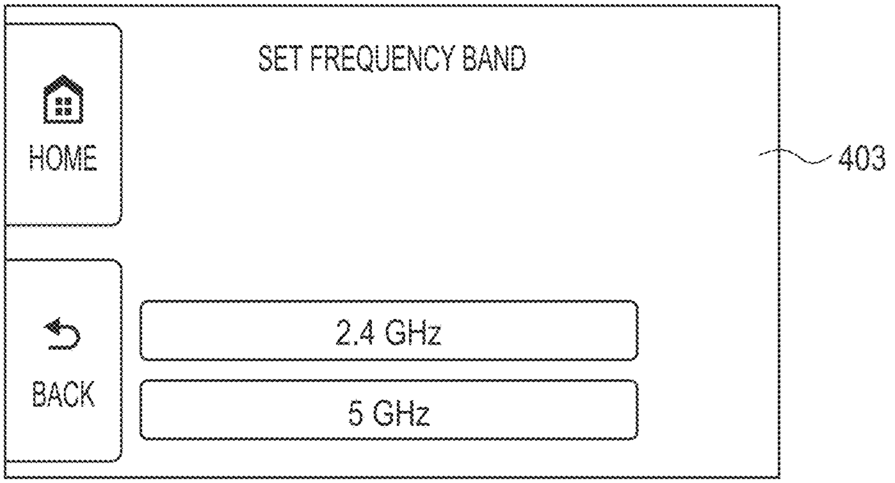

FIG. 4C is a diagram illustrating an example of a screen displayed on the communication device.

Figure 5:
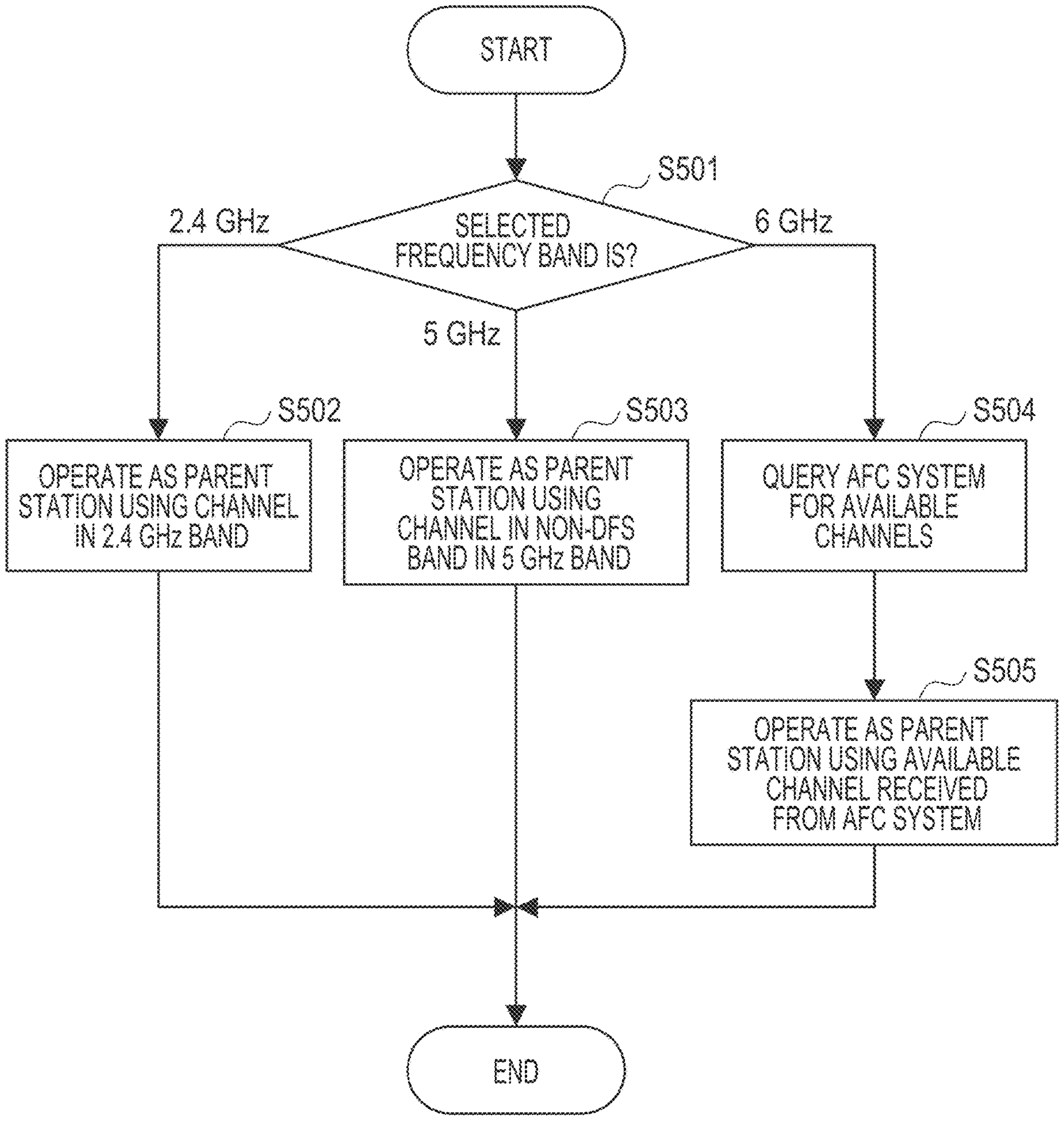

FIG. 5 is a diagram illustrating an example of a flowchart executed by the communication device.

DESCRIPTION OF EMBODIMENTS

Hereinafter, an embodiment of the present invention will be described in detail with reference to the drawings. Note that the present embodiment is merely an example, and specific examples of components, processing steps, display screens, etc., are not intended to limit the scope of the present invention thereto unless otherwise specified.

System Configuration

Figure 1:
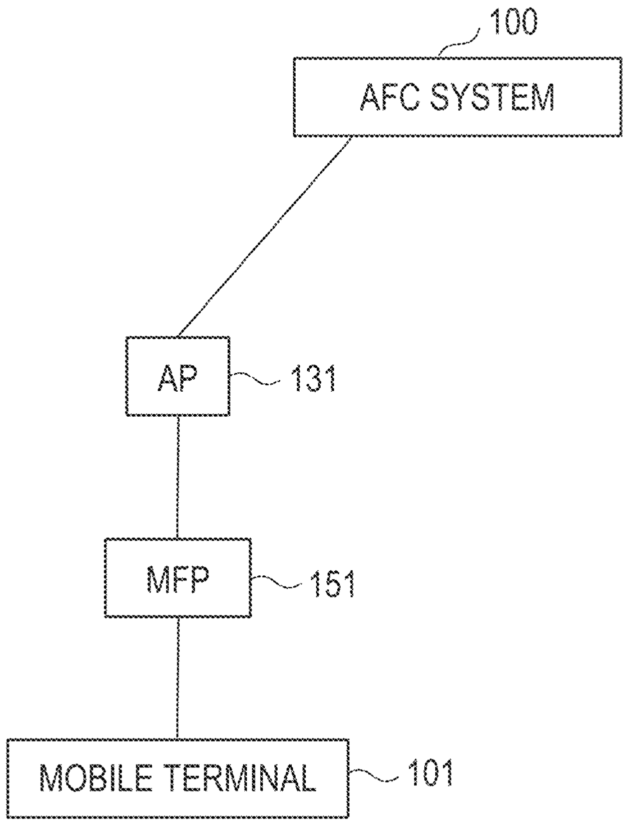
FIG. 1 is a diagram illustrating an example of a system configuration according to the present embodiment.

FIG. 1 illustrates an example of the configuration of a system according to the present embodiment. The present system is, in an example, a wireless communication system in which multiple communication devices can communicate wirelessly with each other. In the example of FIG. 1, the present system includes an access point (AP) 131, an MFP 151, and a mobile terminal 101. Note that the mobile terminal 101 is an example of a mobile terminal 101, which is a laptop or a smartphone. The present system additionally includes an Automated Frequency Coordination (AFC) system 100. The MFP 151 is capable of communicating with the AFC 100 via the AP 131. Note that the MFP 151 in the present embodiment is capable of wireless communication using at least the 6 GHz band and operates as a Standard Power Device. Standard Power Devices have less stringent transmission power limitations compared to Very Low Power Devices and Low Power Indoor-Only Devices. In contrast, devices operating as Standard Power Devices query the AFC system 100 for a frequency range or channels available for use in 6 GHz band wireless communication and, upon receiving the response, they determine the frequency range or channel to use in the 6 GHz band.

The MFP 151 has a print function, a read function (scanner), a fax function, and the like. In addition, the MFP 151 in the present embodiment has a communication function capable of performing wireless communication with the mobile terminal 101. Additionally, although the case in which the MFP 151 is used will be described as an example in the present embodiment, this is not the only possible case. For example, instead of the MFP 151, a fax machine, a scanner, a projector, or a single-function printer may be used. MFP stands for Multi-Function Peripheral. Note that, in the present embodiment, a device having a print function may also be referred to as an image forming device.

The access point 131 is provided separately (externally) from the mobile terminal 101 and the MFP 151, and operates as a base station device for a wireless LAN (WLAN). Note that the access point 131 may also be described as the external access point 131 or an external wireless base station (or external parent station). The MFP 151 with WLAN communication capabilities can communicate in infrastructure mode of the WLAN via the access point 131. Hereinafter, an access point may be referred to as an "AP". Additionally, the infrastructure mode may be referred to as "wireless infrastructure mode" or "infrastructure mode".

The infrastructure mode refers to a form in which the MFP 151 communicates with other devices via an external device that forms a network (for example, the access point 131). A connection to an external access point established by the MFP 151 operating in infrastructure mode is referred to as an infrastructure connection (hereinafter, infrastructure connection). In the present embodiment, in an infrastructure connection, the MFP 151 operates as a child station, and the external access point operates as a parent station. Note that, in the present embodiment, a parent station is a device that determines the communication channel to use in a network to which the parent station belongs, while a child station is a device that does not determine the communication channel to use in a network to which the child station belongs, but instead uses the communication channel determined by the parent station.

The access point 131 performs wireless communication with an (authenticated) communication device that has permitted a connection thereto, and relays wireless communication between the communication device and another communication device. The access point 131 may be connected to, for example, a wired communication network, and may relay communication between a communication device connected to the wired communication network and another communication network wirelessly connected to the access point 131.

The mobile terminal 101 and the MFP 151 may use their respective WLAN communication functionalities to perform wireless communication in wireless infrastructure mode via the external access point 131 or in peer-to-peer mode without using the external access point 131. Hereinafter, peer-to-peer is referred to as "P2P". Alternatively, communication without using the external access point 131 may also be referred to as direct wireless communication. The P2P mode includes Wi-Fi Direct (registered trademark), software AP mode, etc. Hereinafter, Wi-Fi Direct (registered trademark) may be referred to as WFD. It can be said that the P2P mode is communication compliant with the IEEE 802.11 series.

The P2P mode is a form in which the MFP 151 communicates directly with other devices, such as the mobile terminal 101, without using an external device that forms a network. In the present embodiment, it is assumed that the P2P mode includes an AP mode in which the MFP 151 operates as an access point. It is assumed that the connection information (SSID and password) of an access point enabled in the MFP 151 when operating in AP mode can be set arbitrarily by the user. Note that the P2P mode may include, for example, a Wi-Fi Direct (WFD) mode for the MFP 151 to communicate through WFD. Note that which device among multiple WFD-compatible devices operates as the parent station is determined, for example, according to a sequence called Group Owner Negotiation. Alternatively, the parent station may be determined without executing Group Owner Negotiation. A device that is a WFD-compatible device and that functions as the parent station is specifically called the Group Owner. A direct connection to other devices established by the MFP 151 operating in P2P mode is referred to as a direct connection. In the present embodiment, in a direct connection, the MFP 151 operates as the parent station, and other devices (such as the mobile terminal 101) operate as child stations.

As mentioned earlier, in response to queries from devices (inquired Frequency Range or inquired Channels), the AFC system 100 provides the frequency range or channels available for use.

Next, the configuration of a mobile terminal of the present embodiment, and a communication device capable of communicating with the mobile terminal of the present embodiment will be described with reference to FIG. 2. Furthermore, although the present embodiment will be described using the following configuration as an example, the present embodiment is applicable to devices capable of communicating with the communication device, and the present embodiment is not particularly limited to the functions as illustrated in this figure.

The mobile terminal 101 has an input interface 102, a CPU 103, a ROM 104, a RAM 105, an external storage device 106, an output interface 107, a display unit 108, a keyboard 109, a communication unit 110, a short-range wireless communication unit 111, a network interface 112, a USB interface 113, etc. The CPU 103, the ROM 104, the RAM 105, etc. form a computer of the mobile terminal 101.

The input interface 102 is an interface that accepts data input and operation instructions from the user when an operation unit such as the keyboard 109 is operated. Note that the operation unit may be a physical keyboard or a physical button, or it may be a software keyboard or a software button displayed on the display unit 108. That is, the input interface 102 may accept input (operation) from the user via the display unit 108.

The CPU 103 is a system control unit, which controls the entire mobile terminal 101. The ROM 104 stores fixed data such as control programs executed by the CPU 103, data tables, a program for an embedded operating system (referred to hereinafter as OS), etc. In the present embodiment, each control program stored in the ROM 104 performs software execution control such as scheduling, task switching, interrupt processing, etc. under the control of the embedded OS stored in the ROM 104.

The RAM 105 is composed of an SRAM (Static Random Access Memory) or the like which requires a backup power supply. Since the RAM 105 retains data by a primary battery for data backup (not illustrated), it can store important data, such as program control variables, without volatile loss. Additionally, a memory area is provided in the RAM 105 to store settings information for the mobile terminal 101 and management data for the mobile terminal 101. Furthermore, the RAM 105 is used both as the main memory and work memory for the CPU 103.

The external storage device 106 stores, for example, a print information generation program that generates print information that can be interpreted by a printer. The output interface 107 is an interface that controls the display unit 108 to perform data display and notification of the status of the mobile terminal 101.

The display unit 108 is composed of LEDs (light-emitting diodes), an LCD (liquid crystal display), etc. and performs data display and notification of the status of the mobile terminal 101. The communication unit 110 is configured to connect to devices such as the MFP 151 and the access point (AP) 131 to perform data communication. The communication unit 110 can establish a connection to, for example, an access point (not illustrated) in the MFP 151. Establishing a connection between the communication unit 110 and the access point in the MFP 151 enables the mobile terminal 101 and the MFP 151 to perform P2P communication. Note that the communication unit 110 may communicate directly with the MFP 151 through wireless communication, or may communicate via the AP 131, which is external to the mobile terminal 101 and the MFP 151. Note that the external device includes an external access point (such as the access point 131) external to the mobile terminal 101 and external to the MFP 151, and a device capable of relaying communication outside of the access point. In the present embodiment, it is assumed that the wireless communication method used by the communication unit 110 is Wi-Fi (Wireless Fidelity) (registered trademark), which is a communication standard compliant with the IEEE 802.11 series. Additionally, the access point 131 includes, for example, a device such as a wireless LAN router.

The short-range wireless communication unit 111 is configured to perform data communication by wirelessly connecting to a device such as the MFP 151 at a short distance, and performs communication using a communication method different from that of the communication unit 110.

The short-range wireless communication unit 111 can connect to a short-range wireless communication unit 157 in the MFP 151, for example. The communication method includes, for example, Near Field Communication (NFC), Bluetooth (registered trademark) Classic, Bluetooth Low Energy (BLE), Wi-Fi Aware, etc.

The network interface 112 is a connection I/F that controls communication via wireless as well as communication processing via wired LAN cables.

The USB interface 113 is a connection I/F that controls USB connections via USB cables. Specifically, the USB interface 113 is an interface for connecting to devices such as the MFP 151 and the external access point 131 via USB to perform data communication.

Next, the MFP 151 will be described. The MFP 151 has a ROM 152, a RAM 153, a CPU 154, a print engine 155, a communication unit 156, the short-range wireless communication unit 157, an input interface 158, an operation unit 159, an output interface 160, a display unit 161, a network interface 162, a USB interface 163, etc. The ROM 152, the RAM 153, the CPU 154, etc. form a computer of the MFP 151.

The communication unit 156 controls communication processing using each interface. For example, the MFP 151 can operate in infrastructure mode and P2P (Peer to Peer) mode, which serve as modes for communication using the communication unit 156.

Specifically, the communication unit 156 can operate as an access point in the MFP 151. For example, the user giving an instruction to enable the internal access point causes the MFP 151 to operate as an access point. In the present embodiment, it is assumed that the wireless communication method used by the communication unit 156 is a communication standard compliant with the IEEE 802.11 series. Additionally, in the present embodiment, it is assumed that the wireless communication method used by the communication unit 156 a communication standard compliant with at least IEEE 802.11ax. Furthermore, in the following description, Wi-Fi (Wireless Fidelity) (registered trademark) (Wi-Fi communication) is a communication standard compliant with the IEEE 802.11 series. The communication unit 156 may also be provided with hardware that functions as an access point, or may operate as an access point using software for causing it to function as an access point. Note that, when operating as the parent station, the communication unit 156 can maintain simultaneous P2P wireless connections to a specified number of child devices or fewer (e.g., three devices or fewer). Note that the communication unit 156 can perform wireless communication using a frequency band selected from the 2.4 GHz band, 5 GHZ band, and 6 GHz band.

The short-range wireless communication unit 157 is configured for establishing a wireless connection to devices such as the mobile terminal 101 at a short distance, and can connect to the short-range wireless communication unit 111 in the mobile terminal 101. As the communication method, examples include NFC, Bluetooth Classic, BLE, and Wi-Fi Aware.

The RAM 153 is composed of an SRAM or the like which requires a backup power supply. Since the RAM 153 retains data by a primary battery for data backup (not illustrated), it can store important data, such as program control variables, without volatile loss. Additionally, a memory area is provided in the RAM 153 to store settings information for the MFP 151 and management data for the MFP 151. Furthermore, the RAM 153 is used both as the main memory and work memory for the CPU 154. The RAM 153 serves as a reception buffer for temporarily storing print information received from the mobile terminal 101 or the like, and saves various types of information.

The ROM 152 stores fixed data such as control programs executed by the CPU 154, data tables, OS program, etc. In the present embodiment, each control program stored in the ROM 152 performs software execution control such as scheduling, task switching, interrupt processing, etc. under the control of the embedded OS stored in the ROM 152.

The CPU 154 is a system control unit, which controls the entire MFP 151.

Based on information saved in the RAM 153 and a print job received from the mobile terminal 101 or the like, the print engine 155 performs a printing process to form an image on a recording medium, such as paper, by applying a recording agent like ink onto the recording medium, and outputs the printed result. In general, since the data amount of print jobs sent from the mobile terminal 101 or the like is large, it is required to use a communication method capable of high-speed communication in order to communicate print jobs. Therefore, the MFP 151 receives print jobs via the communication unit 156, which is capable of communicating faster than the short-range wireless communication unit 157. Note that printing using ink is merely an example, and printing may also be performed with an electrophotographic method using toner. Furthermore, as for the ink, it may be either an MFP that uses a cartridge type where a cartridge is installed, or an MFP where ink is refilled from an ink bottle into the MFP's ink tank.

Note that the MFP 151 may be attached with a memory such as an external HDD or SD card as an optional device, and information saved in the MFP 151 may be saved in the memory.

The input interface 158 is an interface that accepts data input and operation instructions from the user when the operation unit 159 such as a physical button is operated. Note that the operation unit 159 may be a software keyboard or a software button displayed on the display unit 161. That is, the input interface 158 may accept input from the user via the display unit 161.

The output interface 160 is an interface that controls the display unit 161 to perform data display and notification of the status of the MFP 151.

The display unit 161 is composed of LEDs (light-emitting diodes), an LCD (liquid crystal display), etc. and performs data display and notification of the status of the MFP 151.

The USB interface 163 is an interface that controls USB connections via USB cables. Specifically, the USB interface 163 is an interface for connecting to devices such as the MFP 151 and an external access point via USB to perform data communication.

FIG. 3 is a diagram illustrating a flowchart of the present embodiment executed by the MFP 151. The flowchart of the present embodiment is realized by the CPU 154 reading a program related to the processing of the flowchart from the ROM 152 and executing it. Note that the flowchart of FIG. 3 starts when the user selects "set frequency band" 401 on a setting screen 400 illustrated in FIG. 4A.

The CPU 154 determines whether it can communicate with the AFC system 100 (S301). S301 may be realized, for example, by determining whether the infrastructure mode has been enabled, or by determining whether an infrastructure connection has been established. Alternatively, S301 may be realized by determining whether the MFP 151 can communicate with the AFC system 100.

If it is determined Yes in S301, the CPU 154 displays a setting screen including the 6 GHz option (S302), and, if it is determined No in S301, the CPU 154 displays a setting screen that does not include the 6 GHz option (S303). For example, a setting screen 402 in FIG. 4B is displayed in S302, whereas a setting screen 403 in FIG. 4C is displayed in S303. Note that FIG. 4C illustrates a screen where the 6 GHz option has disappeared, but it is sufficient if a screen where the user cannot select the 6 GHz option is displayed. For example, a screen where the 6 GHz option is grayed out may be displayed. Furthermore, in the case where it is determined No in S301, the CPU 154 may display a screen such as that illustrated in FIG. 4B, and, if the 6 GHz option is selected, display a message indicating that the 6 GHz option is unselectable.

The CPU 154 activates an internal access point in the frequency band selected on the setting screen 402 or the setting screen 403, and operates as the parent station (S304).

The detailed processing in S304 will now be described using FIG. 5.

The CPU 154 determines the frequency band selected on the screen illustrated in FIG. 4B or FIG. 4C (S501).

If the CPU 154 determines that the 2.4 GHz option has been selected, the CPU 154 selects a channel in 2.4 GHZ and operates as the parent station (S502). At this time, the same channel as the channel used in infrastructure communication may be selected, or a channel different from the channel used in infrastructure communication may be selected.

If the CPU 154 determines that the 5 GHz option has been selected, the CPU 154 selects a channel in the non-DFS (Dynamic Frequency Selection) band from among channels in the 5 GHz band, and operates as the parent station (S503). The channels in the non-DFS band correspond to the W52 channels. The reason for selecting a channel in the non-DFS band is that the MFP 151 does not have the DFS functionality.

If the CPU 154 determines that the 6 GHz option has been selected, the CPU 154 queries the AFC system 100 for channels available for use (S504). At this time, the CPU 154 queries the AFC system 100 for channels available for use in 80 MHz of UNII-5, for example. Upon receipt of this query, the AFC system 100 provides channels available for use for 80 MHz communication within the UNII-5 range (5925 MHz to 6425 MHZ).

The CPU 154 operates as the parent station using a channel available for use, which it has received from the AFC system 100 (S505). Note that, in the case where multiple channels are received as channels available for use in S505, the CPU 154 may select a channel based on the channel used in infrastructure communication. For example, the CPU 154 may select a channel different from the channel used in infrastructure communication.

The above processing enables direct communication between the MFP 151, which operates as the parent station, and the mobile terminal 101. For example, the MFP 151 may perform a printing process based on print data received from the mobile terminal 101. The MFP 151 may also use this direct communication to send the remaining amount of consumables to the mobile terminal 101. The remaining amount of consumables corresponds to, for example, the remaining amount of ink or the remaining amount of toner.

Although the above embodiment has been described using the MFP 151 as an example, the present embodiment may be realized with other devices. For example, the processing in the above-described embodiment may be performed by devices such as digital cameras, single-function printers, single-function scanners, projectors, smartphones, etc.

The present invention can also be realized by supplying a program that implements one or more functions of the above-described embodiment to a system or device via a network or storage medium, and having one or more processors in the system or device read and execute the program. Additionally, the present invention can also be realized by a circuit (e.g., ASIC) that implements one or more functions.

The present invention is not limited to the above-described embodiment, and various changes and modifications can be made without departing from the spirit and scope of the present invention. Accordingly, the following claims are appended to make the scope of the invention public.

According to the present invention, more efficient wireless communication techniques can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device capable of performing first wireless communication via an external access point and second wireless communication without using an external access point, comprising:

at least one memory and at least one processor which function as:

a display control unit configured to perform control to display, in a case where the communication device operates in a state in which the communication device is capable of obtaining frequency information indicating a frequency available for use in wireless communication in a 6 GHz band from an external device, a first setting screen including an option corresponding to the 6 GHz band as an available frequency band option for use when the communication device operates as a parent station in the second wireless communication, and, in a case where the communication device does not operate in a state in which the communication device is capable of obtaining the frequency information from the external device, to display a second setting screen where selecting the 6 GHz band as an available frequency band option for use when the communication device operates as a parent station in the second wireless communication is restricted;

an identifying unit configured to identify a communication channel in the 6 GHz band based on the frequency information received from the external device in a case where an option corresponding to the 6 GHz band is selected on the first setting screen; and a wireless communication control unit configured to operate as a parent station in the second wireless communication using the identified channel, wherein the parent station in the second wireless communication determines a communication channel to use in the second wireless communication.

2. A communication device comprising:

at least one memory and at least one processor which function as:

a display control unit configured to perform control to display, in a case where the communication device operates in a state in which the communication device is capable of obtaining frequency information indicating a frequency available for use in wireless communication in a 6 GHz band from an external system, a first setting screen allowing the 6 GHz band to be set as a frequency band for use by the communication device, and, in a case where the communication device operates in a state in which the communication device is incapable of obtaining the frequency information from the external system, to display a second setting screen that does not allow the 6 GHz band to be set as a frequency band for use by the communication device;

an identifying unit configured to identify a communication channel in the 6 GHz band based on the frequency information received from the external system in a case where use of the 6 GHz band is set based on an operation on the first setting screen; and a control unit configured to perform control to execute wireless communication using the communication channel identified by the identifying unit.

3. The communication device according to claim 2, wherein the at least one memory and the at least one processor further function as a print control unit configured to perform control to execute a printing process on paper based on print data received via wireless communication using the communication channel identified by the identifying unit.

4. The communication device according to claim 2, wherein a remaining amount of ink is sent to a device of a communication partner via wireless communication using the communication channel identified by the identifying unit.

5. The communication device according to claim 2, wherein:

the first setting screen is a screen where an option to set the 6 GHz band as a frequency band for use by the communication device is displayed; and the second setting screen is a screen where an option to set the 6 GHz band as a frequency band for use by the communication device is not displayed.

6. The communication device according to claim 2, wherein:

the first setting screen is a screen where an option to set the 6 GHz band as a frequency band for use by the communication device is displayed as selectable; and the second setting screen is a screen where an option to set the 6 GHz band as a frequency band for use by the communication device is displayed as unselectable.

7. The communication device according to claim 2, wherein:

based on selection of an option corresponding to the 6 GHz band displayed on the first setting screen, the 6 GHZ band is set as a frequency band for use by the communication device for wireless communication; and even in response to selection of an option corresponding to the 6 GHz displayed on the second setting screen, the 6 GHz is not set as a frequency band for use by the communication device for wireless communication.

8. The communication device according to claim 2, wherein the display control unit further performs control to display a specific notification without setting the 6 GHZ band as a frequency band for use by the communication device for wireless communication in response to selection of an option corresponding to 6 GHz displayed on the second display screen.

9. The communication device according to claim 2, wherein a state in which the communication device is capable of obtaining the frequency information from the external system is a state in which first wireless communication via an external access point can be performed.

10. The communication device according to claim 2, wherein a state in which the communication device is capable of obtaining the frequency information from the external system is a state in which the communication device is capable of communicating with an Automated Frequency Coordination (AFC) system, which is the external system.

11. The communication device according to claim 2, wherein wireless communication using the communication channel identified by the identifying unit is communication compliant with IEEE 802.11 series.

12. The communication device according to claim 2, wherein the display control unit performs control to display the second setting screen when the communication device operates as a standard power device.

13. The communication device according to claim 2, wherein the communication device is capable of performing first wireless communication via an external access point and second wireless communication without using an external access point, and wireless communication using the communication channel identified by the identifying unit is the second wireless communication.

14. The communication device according to claim 13, wherein, in a case where the frequency information obtained from the external system indicates that a plurality of communication channels in the 6 GHz band are available for use, the identifying unit identifies a communication channel in the 6 GHz band for use in the second wireless communication based on a communication channel used in the first wireless communication.

15. The communication device according to claim 14, wherein the identifying unit identifies a communication channel different from a communication channel used in the first wireless communication as a communication channel in the 6 GHz band for use in the second wireless communication.

16. The communication device according to claim 13, wherein the first wireless communication and the second wireless communication are communication compliant with IEEE 802.11 series, the first wireless communication being communication in infrastructure mode, and the second wireless communication being communication in peer-to-peer mode.

17. The communication device according to claim 13, wherein a parent station in the second wireless communication determines a communication channel for use in the second wireless communication.

18. A control method for a communication device, comprising:

in a case where the communication device operates in a state in which the communication device is capable of obtaining frequency information indicating a frequency available for use in wireless communication in a 6 GHz band from an external system, displaying a first setting screen allowing the 6 GHz band to be set as a frequency band for use by the communication device;

in a case where the communication device operates in a state in which the communication device is incapable of obtaining the frequency information from the external system, displaying a second setting screen that does not allow the 6 GHz band to be set as a frequency band for use by the communication device;

identifying a communication channel in the 6 GHz band based on the frequency information obtained from the external system in a case where use of the 6 GHz band is set based on an operation on the first setting screen; and performing control to perform wireless communication using the identified communication channel.

19. A non-transitory computer-readable storage medium storing one or more programs for executing a method for controlling a communication device, the method comprising:

in a case where the communication device operates in a state in which the communication device is capable of obtaining frequency information indicating a frequency available for use in wireless communication in a 6 GHz band from an external system, displaying a first setting screen allowing the 6 GHz band to be set as a frequency band for use by the communication device;

in a case where the communication device operates in a state in which the communication device is incapable of obtaining the frequency information from the external system, displaying a second setting screen that does not allow the 6 GHz band to be set as a frequency band for use by the communication device;

identifying a communication channel in the 6 GHz band based on the frequency information obtained from the external system in a case where use of the 6 GHz band is set based on an operation on the first setting screen; and performing control to perform wireless communication using the identified communication channel.

* * * * *